United States Patent Office 3,666,621
Patented May 30, 1972

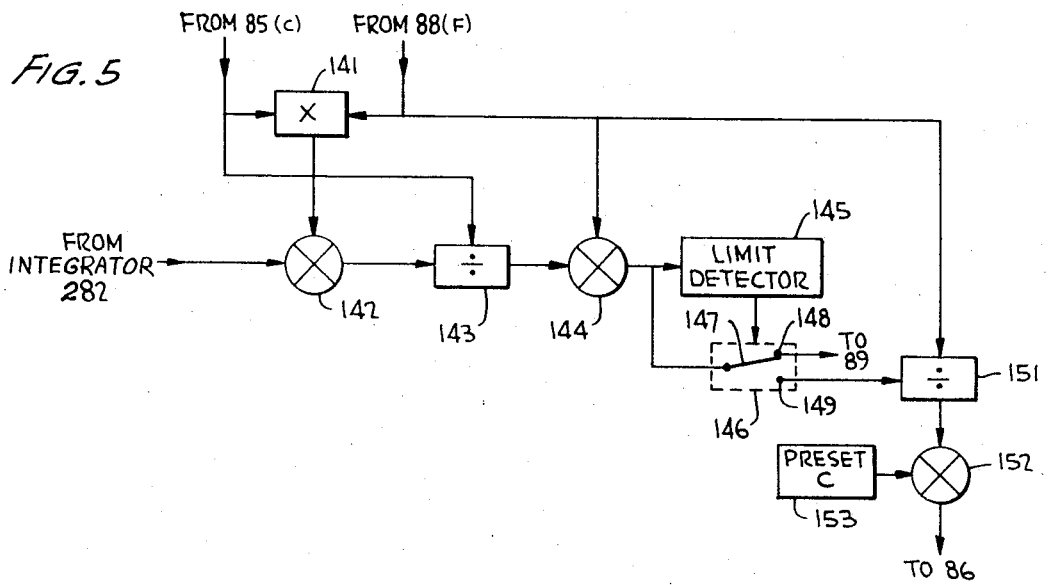
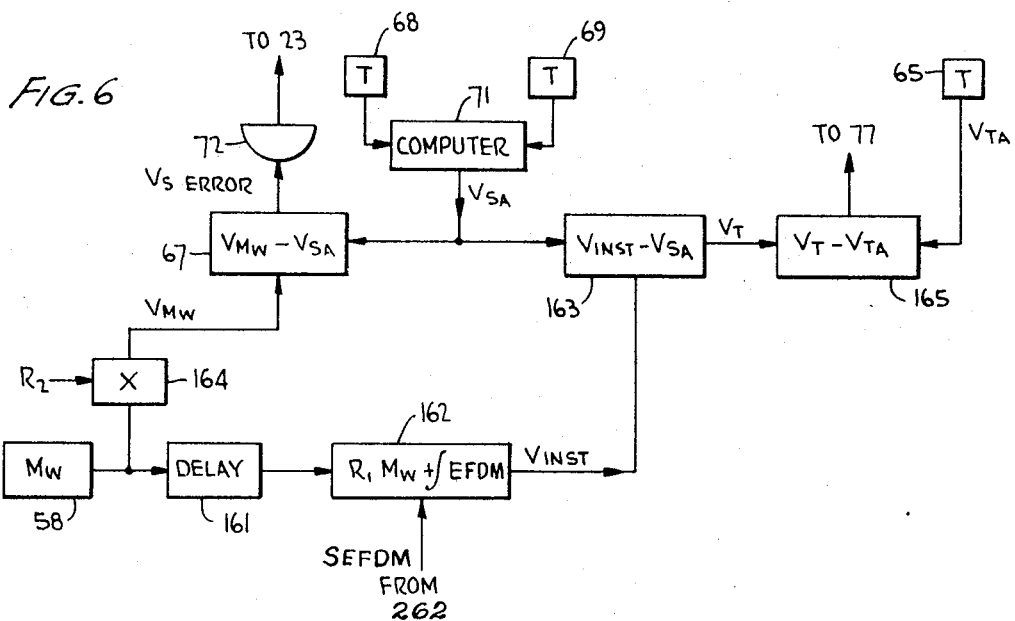

---

3,666,621
PROCESS AND APPARATUS FOR MOISTURE AND FIBER CONTENT CONTROL IN A PAPERMAKING MACHINE
William L. Adams, Dublin, Ohio, assignor to
Industrial Nucleonics Corporation
Filed Feb. 16, 1968, Ser. No. 706,161
Int. Cl. D21f 5/06
U.S. Cl. 162—198                40 Claims

ABSTRACT OF THE DISCLOSURE

Disclosed are a system for and method of controlling processes of paper sheet manufacture. In response to basis weight signals at the process wet and dry ends, as well as a moisture signal from the dry end, a proportionality constant indicative of the sheet fiber fraction at the wet end is computed. The proportionality constant is repeatedly recomputed once every twenty minutes and is stored between recomputations. The proportionality constant is combined with a wet end basis weight output derived at a later time than the above signals to indicate fiber content at the dry end and control fiber flowing into the paper making headbox. Control of fiber flow into the headbox and moisture removed by the drying sections is respectively in response to indications of the amount of fiber and moisture at the dry end being less than defective limits. The dryers are controlled by wet end moisture and dry end composite profile moisture. The dryers are controlled so that the inherent lag of steam units therein is compensated by heat supplied by trim dryers, having fast response times. To derive instantaneous values of average wet end basis weight, the wet end gauge is normally single pointed and only periodically scanned across the sheet.

---

The present invention relates generally to process control systems and methods wherein an adaptive control parameter is derived in response to measurements made at differing points along the process. In another aspect, the invention relates to a process system and control method wherein slow and fast response time dryers are activated so that the total moisture removed from a length of material is established in response to a set point signal.

In the manufacture of sheet materials, such as paper, wherein there is an appreciable delay or transport lag between operations and measurements made at differing points in the process, it is frequently a desideratum to determine what a property value will be at a point at the end of the process from data derived at a point close to the beginning thereof. In paper making, for example, it is desirable to know the fiber content in the finished product as soon as possible because fiber is one of the initial inputs to the process. With presently existing techniques, however, the fiber content in the finished product can be calculated only after the processing of the product has been completed, which occurs approximately one and a half minutes after the time fiber enters the system. Because of the substantial delay or transport lag in the process, the generally utilized technique of the prior art is to measure fiber content and make only periodic, rather than continuous, corrections to the fiber flow at the beginning of the process. Variations in the fiber flow must be made only periodically, on a basis of once every two minutes, for example, because the change indicated by the measurement may be excessive. Of course, if the change is excessive, it is not detected until a complete transport lag has elapsed between the input and output or dry end of the process.

According to an important feature of the present invention, a calculation of fiber content in the product at the dry end of the process is made in response to a measurement made at the wet end thereof, i.e., immediately downstream of the Fourdrinier wire. Since there is only approximately a 15 second transport lag between the input and the wet end of the process, it is seen that the delay attendant with prior art techniques is avoided, whereby either continuous control of fiber flow may be effected or fiber flow may be changed on a relatively rapid periodic basis, e.g., once every 15 seconds. Of course, if the fiber flow compensation is performed once every 15 seconds, rather than once every 2 minutes, much more rigid quality requirements for the product may be established.

Computation of the fiber content from the sheet at the wet end is made in response to the output of a basis weight gauge located at the wet end. Periodically the desorption factor of dryers positioned between the wet and dry ends is calculated in response to measurements derived from the wet end basis weight gauge, as well as the dry end basis weight and moisture gauges. The desorption factor is combined with the instantaneous basis weight signal derived from the wet end gauge to provide control signals for fiber flow moving into the process.

According to another feature of the present invention, the poor, relatively long response time of steam dryers, in facilities such as paper making mills, to changing command signals is compensated by including fast response trim dryers, which may be electrically or gas driven. Control of the dryers is in response to the wet end basis weight gauge output, whereby the slow speed of response steam dryers are activated immediately in response to changes in the desired drying rate thereof. Because, however, the steam dryers have a slow response time, the change in moisture removed thereby from the paper sheet is not immediately very great. To compensate for the slow response speed of the steam dryers, the trim dryer is provided.

A problem exists, however, if conventional control techniques are employed for driving the trim dryer due to the transport lag of approximately one minute between the wet end basis weight gauge and trim dryer. Because of the transport lag, if the trim dryer were activated immediately in response to a detected change in moisture at the wet end, a considerable portion of the paper manufactured before the change occurred would be dried improperly. To obviate this possibility, a delay is interposed between the apparatus deriving the moisture measuring signal in response to the wet end basis weight gauge and the trim dryer activating apparatus. The trim and steam dryers are connected in a multiple feedback loop arrangement, whereby the total drying rate of both types of dryers remains constant and dependent upon the moisture in the sheet passing through the different drying sections.

It is, accordingly, an object of the present invention to provide a new and improved method of and apparatus for controlling the manufacture of sheet processes.

Another object of the present invention is to enable signals indicative of finished properties of a sheet being manufactured to be derived at a relatively early point in the process.

An additional object of the present invention is to provide, in a paper making facility, a system for and method of generating fiber content indications of the finished product from signals derived at the wet end, i.e., almost immediately downstream of the Fourdrinier wire.

Still another object of the present invention is to provide, in a paper making facility, a system for and method of controlling fiber flow in response to signals derived from the wet end of the process, whereby delay times in controlling fiber flow are reduced.

Yet another object of the present invention is to provide a system for and method of computing fiber content of a finished paper product in response to measurements made at the wet end of the process.

Another object of the present invention is to provide a system for and method of compensating the inherent lag of steam dryers in responding to command signals.

Still another object of the present invention is to provide in a sheet manufacturing process an apparatus for and method of compensating for the inherent lag of steam dryers, or the like, in responding to signals by the use of fast response time dryers, wherein the transport lag between a measuring device and the dryers is compensated.

The above and still further objects, features and advantages of the present invention will become apparent upon consideration of the following detailed description of one specific embodiment thereof, especially when taken in conjunction with the accompanying drawings, wherein:

FIG. 5 is a block diagram of the fiber flow controller in the system of FIG. 1; and FIG. 6 is a block diagram of the moisture controller in the system of FIG. 1.

Figure 1:
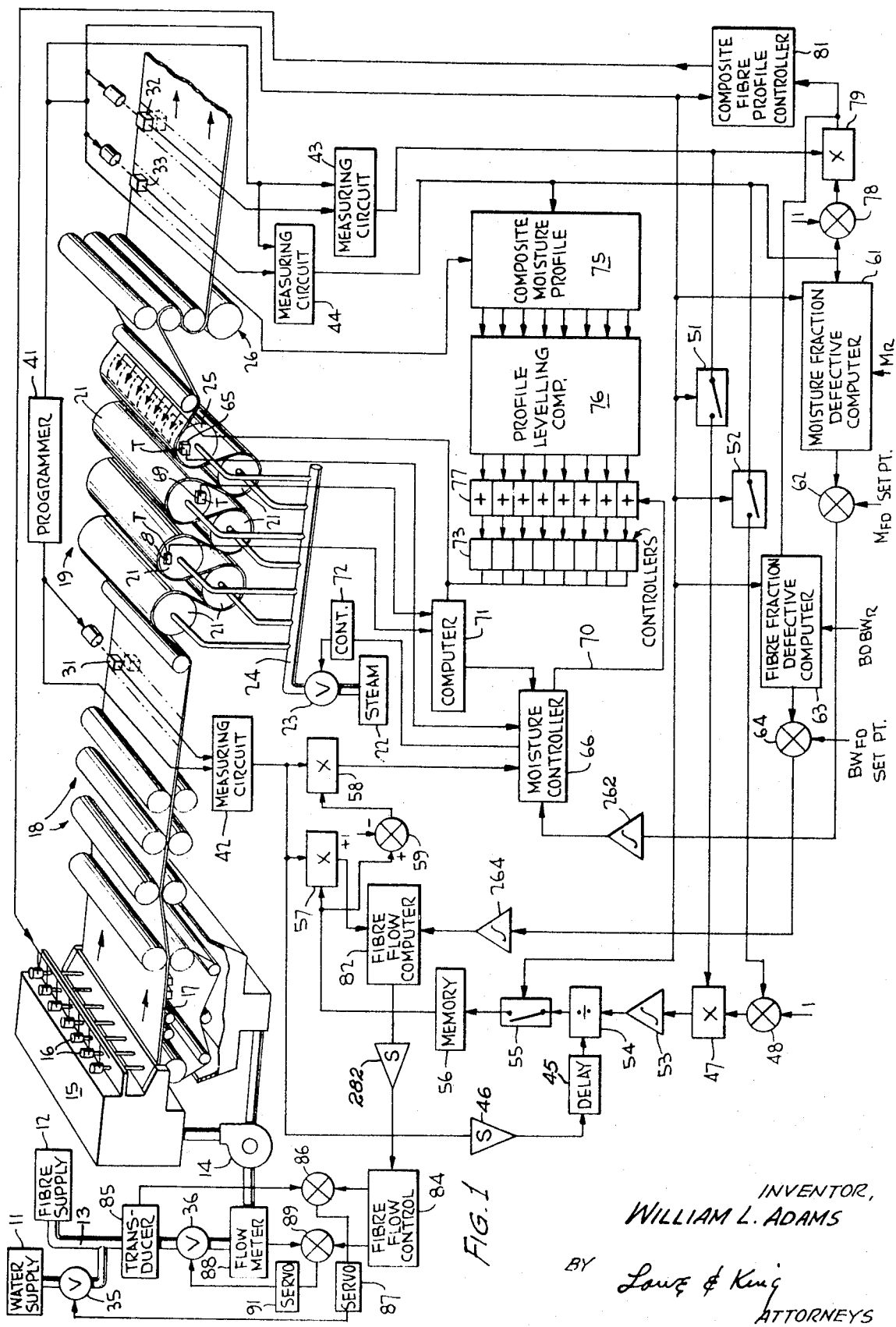
FIG. 1 is a diagram schematically illustrating a preferred embodiment of the present invention, in combination with a paper making facility.

Reference is now made to FIG. 1 of the drawings wherein there is illustrated a control system in accordance with the present invention, in combination with a papermaking facility. The papermaking facility is of the conventional type, including a source 11 of clear water mixed with a fiber from source 12 in pipe 13. The fiber-water mixture in pipe 13 is fed through valves and controllers, described infra, to pump 14. Pump 14 also receives returned white water and feeds the white water and fiber-water mixture in pipe 13 to headbox 15.

Downstream of headbox 15, that includes the usual slice screws 16, is Fourdrinier wire 17. Water in the mixture emerging from the slice opening of headbox 15 is removed to a certain extent by suction and gravity through Fourdrinier wire 17, the drainage of which comprises the white water supply for pump 14. Downstream of Fourdrinier wire 17 are water removing press rollers 18, followed by drying section 19 which is controlled by the disclosed system as seen infra.

Dryers 19 are divided into two sections, the first being steam dryers 21, which are heated in response to steam emerging from supply 22 coupled to the dryers via valve 23 and manifold 24. Steam dryers 21 have a relatively long response time or time contant, on the order of one to two minutes as typical values, whereby one or two minutes is required for the temperature change of the dryers to reach approximately 63% of the temperature change called for by a controller. Dryer section 19 also includes a relatively high speed, segmented trim dryer 25. Dryer 25 is preferably positioned downstream of all of the steam dryers 21 but differs from the steam dryer by having a fast response time, on the order of five seconds. Dryer 25 is divided into a plurality of separate, controlled sections across the width of the paper sheet. As is known in the art, such a segmented trim dryer may comprise a plurality of separate electric, gas or segmented air dryers.

The relatively moisture-free paper emerging from dryer section 19 is polished and smoothed by calender rollers 26. The sheet emerging from rollers 26 is the finished product that is fed to a takeup roller, not shown.

The disclosed system, in addition to controlling the moisture removed by dryer section 19, enables the fiber weight per unit area of the paper to be controlled both along the sheet length and across the sheet width. To control the fiber along the sheet length, the ratio of clear water to fiber, that is consistency, of the mixture fed into headbox 15 may be controlled with valve 35 in the clear water line. The rate at which the fiber-water mixture is applied to pump 14 and headbox is also controlled by valve 36, placed in series with line 13 upstream of pump 14. The relative weight per unit area of the paper can be controlled as a cross direction function by adjusting slice screws 16 relative to each other. In addition to being controlled by valves 35 and 36, slice screws 16 and dryers 19, the paper product can be varied in properties by changing the relative pressure between various sections of rollers 18.

Consideration is now given to apparatus utilized for deriving signals for driving the various controllers of fiber flow and drying rate. Determinations of the basis weight, i.e., total sheet weight per unit area, and percent moisture content of the sheet are derived with gauges capable of scanning the sheet at two separate locations in the process. Between press rollers 18 and steam dryers 21, at the wet end of the process, is positioned basis weight gauge 31; while downstream of calender rollers 26, at the dry end of the process, are located basis weight gauge 32 and moisture gauge 33. Basis weight gauges 31 and 32 are preferably of the nucleonic type, including a penetrating radiation source and radiation detector, while moisture gauge 33 is preferably of the capacitance type. Gauges 32 and 33 are both mounted on the same bracket, whereby the moisture and basis weight signals generated thereby provide measurements of virtually identical sections of the sheet.

Typically, the sheet being manufactured by the mill illustrated propagates at a velocity on the order of 700 to 1,000 feet per minute, whereby the transport lag in feeding the mixture from pipe 13 to basis weight gauge 31 is on the order of 15 seconds, while the transport lag between gauge 31 and gauge 32 or trim dryer 25 is approximately 1 minute.

In operation, gauges 31–33 are scanned across the width of the paper sheet to derive profile measurements indicative of wet end basis weight, dry end basis weight and moisture. The wet and dry end gauges are selectively scanned across the sheet width at different times in response to an output of programmer 41. Gauges 31–33 are also selectively driven to a predetermined point across the width of the sheet to derive single point measurements of moisture and basis weight.

The responses of each of gauges 31–33 are respectively derived from measuring circuits 42–44, described infra, and may be considered as two separate data sets. While the gauges 31–33 are in a scanning mode, measuring circuits 42–44 generate D.C. voltages indicative of the instantaneous values of moisture and basis weight detected by the gauges. After a scan of gauges 31–33 has been completed, each of the corresponding measuring circuits 42–44 computes the average value for the previous scan of the property detected thereby. The average value is compared with the property value at the single point to establish the difference between the single point property value and the average property value over the scan. The difference between the single point and average value of the property is combined with the value of the property detected by the gauge during the following single point interval. Thereby, relatively accurate indications of the average value of the property are derived while the gauge is in a single point mode.

Programmer 41 controls gauges 31–33 so that the dry end gauges 32 and 33 are scanned approximately 95% of the time during system operation while gauge 31 is scanned only 10% of the time. Typically, two minutes are required for each scan of gauges 31–33; gauges 32 and 33 are in single point operation for one minute out of every twenty minutes; gauge 31 is scanned once during every twenty minutes; and during the first minute gauge 31 is being scanned gauges 32 and 33 are in the single point mode. It is to be understood that the times stated may be varied and do not include gauge standardization intervals.

In response to the normal operation conditions of the gauges, dry end gauges 32 and 33 drive circuits 43 and 44 so that the circuit outputs are indicative of relatively long term, low frequency data indicative of the average properties of the sheet over a number of gauge scans at a plurality of points or the average value of property across the sheet width scanned. In contrast, gauge 31 derives data generally indicative of short term, high frequency fluctuations of the sheet.

Scanning of gauges 32 and 33 is periodically terminated and they are activated to the single point mode to enable a relatively constant control action of the process to be computed for the same cross machine and machine direction region of the sheet as detected by gauge 31 at a time while it was in the single point mode. To this end, gauges 32 and 33 are driven by programmer 41 to a predetermined point across the width of the sheet for approximately one minute out of every 20 minutes. The single point position of gauges 32 and 33 is the same distance from the sheet edge as the single point position of gauge 31 and begins one minute after gauge 31 began measuring in the single point position. Since there is a one minute transport lag between wet end gauge 31 and dry end gauges 32 and 33, the single pointing dry end gauges are responsive to about the same portion of the sheet as was detected by gauge 31 during the last minute of its single point operation prior to the scan. The signals generated by circuits 42–44 for the one minute while dry end gauges 32 and 33 are in the single point mode can be made to coincide in time for the same portion of the sheet by delaying the wet end basis weight signal derived from measuring circuit 42. By combining the delayed signal from the wet end with signals derived from the dry end during the single point mode, the relatively constant wet end fiber fraction introduced by the Fourdrinier and presses is thereby determined periodically. In particular, the wet end fiber fraction, $k$ is determined by computing the sheet fiber content (BDBW), frequently referred to as bone dry basis weight, from single point outputs of dry end gauges 32 and 33, and taking the ratio of the fiber content to the wet end basis weight.

To derive the wet end fiber fraction signal, the wet end basis weight (WEBW) output signal of measuring circuit 42 is applied continuously to D.C. analog integrating network 46 which drives one minute delay network 45. Integrating network 46 has a time constant selected whereby the output voltage derived thereby is indicative of the signal applied thereto for the preceding minute. Thereby, for the minute while dry end gauges 32 and 33 are in the single point mode, the output of delay unit 45 is indicative of the average wet end basis weight of the portion of the sheet being detected by gauges 32 and 33. To compute the sheet fiber content at the dry end, the D.C. analog output voltages of measuring circuits 43 and 44 are selectively applied to the inputs of analog multiplier 47 and substracter 48, respectively. The output signals of circuits 43 and 44 are fed to multiplier 47 and subtracter 48 through the normally open circuited contacts of switches 51 and 52, which contacts are closed in response to the output of programmer 41 only during the one minute while dry end gauges 32 and 33 are in single point operation. Subtraction circuit 48 responds to a constant D.C. voltage having a value proportional to one, as well as to the output of moisture measuring circuit 44. Since the output of moisture measuring circuit 44 is proportional to the present moisture content of the weight per unit area of the sheet at the dry end of the process, subtracter 48 derives a D.C. voltage indicative of fiber percentage, by weight, in the sheet at the dry end. The percent fiber indicating output signal of subtracter 48 is multiplied by the dry end basis weight signal derived from measuring circuit 43 in multiplier 47, having a D.C. output voltage proportional to weight per unit area of fiber at the dry end (BDBW), a term frequently referred to in the art as bone dry basis weight.

The bone dry basis weight output voltage of multiplier 47 is applied to D.C. analog integrator 53, having a time constant equal to one minute, whereby the integrator derives a D.C. output voltage proportional to the average bone dry basis weight of the sheet at the dry end for the one minute while the gauges were activated to the single point mode. Thereby, upon completion of the one minute period of gauges 32 and 33 activated to the single point mode, the output voltages of delay unit 45 and integrator 53 are D.C. voltages respectively representing the average wet end basis weight ($\overline{WEBW}$) and average bone dry basis weight ($\overline{BDBW}$) for identical portions of the sheet. To compute the amount of moisture removed from the sheet by dryer section 19 while the dry end gauges 32 and 33 were in the single point mode, the output voltages of delay element 45 and integrator 53 are continuously applied as divisor and divident inputs respectively to analog division circuit 54. Division circuit 54 responds to the two D.C. analog signals applied thereto to derive a D.C. analog output voltage indicative of a relatively stable adaptive proportionality constant, $k$ indicative of the fraction of the basis weight at the wet end which is made up of fiber. The proportionality constant is therefore computed as:

$$k = \frac{(\overline{BDBW})}{(\overline{WEBW})} \qquad (1)$$

At the termination of the one minute period of gauges 32 and 33 being in the single point mode, the output voltage of divider 54 is gated through the normally open circuit contacts of switch 55 to analog memory 56. The contacts of switch 55 are closed for a relasively short time interval in response to a control signal from programmer 41 as each one minute single point mode operation of gauges 32 and 33 is being completed to load memory 56 with a new value of $k$, which is independent of any prior $k$ value which may have been stored in the memory. Initially, memory 56 is preloaded with a value of $k$ based on a priori knowledge of the paper machine characteristics.

Once a $k$ value is stored in memory 56 it is available to be continuously read from the memory into apparatus for computing wet end moisture ($M_w$) and predicted bone dry basis weight ($\hat{BD}$) in response to basis weight signals derived from wet end basis weight gauge 31. The $k$ value stored in memory 56 is utilized effectively to enable the fiber content or bone dry basis weight of the sheet portion passing wet and gauge 31 to be derived because the amount of moisture which dryer section 19 removes from the sheet remains relatively constant over a twenty minute period between calculations of $k$. The derivation of fiber content signals from the wet end gauge 31 output enables fiber flow control to be effected after approximately a 15 second transport lag.

The value of $k$ stored in memory 56 is combined with the instantaneous wet end basis weight (WEBW) signal derived from gauge 31 and measuring circuit 42 to compute predicted dry end bone dry basis weight and wet end moisture weight per unit area as:

$$\hat{BD} = (WEBW)\,k \qquad (2)$$

and $$M_w = WEBW\,(1-k) \qquad (3)$$

From Equations 2 and 3 it is appreciated that the value of $k$ is, in effect, a proportionality constant utilized for determining predicted bone dry and wet end moisture weight per unit area. Since the value of $k$ is computed in response to actual measurements made on the process and is not established on a prior basis once the process has been in operation, the system can be considered as adaptive and $k$ as an adaptive function.

To determine the values of $\hat{BD}$ and $M_w$, the D.C. output voltage of memory 56 is combined with the D.C. wet end basis weight output voltage of measuring circuit 42 in a computer comprising analog multipliers 57 and 58, as well as analog subtraction network 59. Multiplication network 57 responds to the output voltages of memory 56 and measuring circuit 42 to derive a D.C. voltage proportional to the value of predicted bone dry basis weight, as determined by Equation 2. The solution of Equation 3 involves feeding the output of memory 56 to subtraction network 59, the subtrahend input of which is a constant D.C. voltage proportional to one. Thereby, subtraction network 59 derives a D.C. analog output voltage indicative of the percent moisture in the sheet at the wet end. The fiber indicating output voltage of subtractor 59 is multiplied by the basis weight output signal of measuring circuit 42 in multiplying network 58, having a D.C. analog output voltage proportional to the total wet end moisture detected by gauge 31.

The predicted bone dry and wet end moisture signals respectively derived from multipliers 57 and 58 are utilized in a manner described infra for respectively controlling the flow of fiber into pump 14 and the amount of moisture removed from the sheet by dryer 19. Because sheet fiber content is calculated in response to measurements made at relatively early or upstream portion of the process, fiber flow control can be made continuously or on a periodic basic of once every 15 seconds, the transport lag between the fiber-water inlet to pump 14 and wet end gauge 31. In contrast, fiber measurements made exclusively from dry end gauges 32 and 33, enable fiber flow adjustments approximately every 1.5 minutes. The calculation of wet end moisture enables dryer section 19 to be controlled to anticipate changes in the moisture of the sheet being fed to the dryer. Before considering the manner by which the output signals of multipliers 57 and 58 control the fiber flow to pump 14 and headbox 15, as well as the desorption rate of dryers 19, a description will be given to the method and apparatus for deriving other control parameters affecting fiber flow and moisture.

In addition to control by the outputs of multipliers 57 and 58, the fiber flowing into pump 14 and the desorbing properties of dryer 19 are responsive to signals representing amount of unacceptable product in the sheet passing dry end gauges 32 and 33. In the manufacture of paper, as all other products, the finished product has varying qualities which can be determined on a statistical basis. In paper manufacture, the quality of the product is determined by, interalia, the grade of fiber introduced into the process from source 12, the conditions of headbox 15, Fourdrinier wire 17, and the felts on rollers 18. If the process produces a product having properties conforming with a normal statistical distribution, a curve of the values of the property versus the amount of the product having the stated property values has the familiar, bell shaped normal distribution curve. The maximum point on the curve is identical with the average value of the product produced. If the process produces a product conforming with the normal distribution, the process can be controlled in response to a function related to standard derivation. In particular, if a limit is set on the amount a product property may fall outside of a certain standard deviation, the average value of the product produced by the process can be controlled. Such a system and method for controlling a process is disclosed in the copending application of Charles T. Fitzgerald, Jr., Ser. No. 680,695, filed Nov. 6, 1967, bearing the title "Process Controller with Dynamic Set-Point Adjustment Responsive to the Statistical Variance of the Controlled Property," now Pat. No. 3,515,860 and commonly assigned with the present invention. A controller of the type disclosed by the Fitzgerald, Jr. application could be utilized in the present combination and connected to be responsive to the outputs of basis weight and moisture measuring circuits 43 and 44.

One problem, however, with the system and method disclosed in said Fitzgerald, Jr. application is that the statistical computations become rather complex when the product does not follow a normal distribution. In paper manufacture, moisture and basis weight value commonly do not have a normal distribution. In the presently disclosed system, the quality of the paper product is determined by measuring the fraction of percentge defective of the sheet having amounts of moisture and basis weight exceeding limits at the process dry end.

Figure 2:
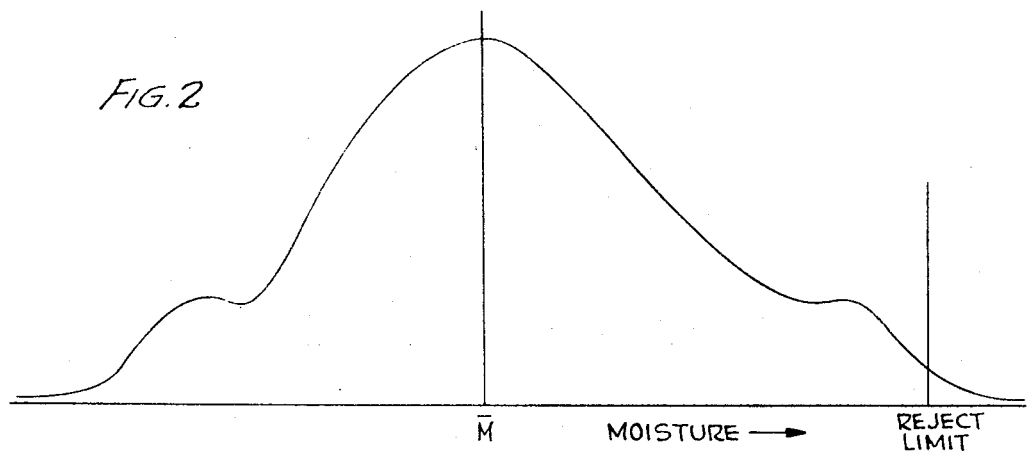
FIG. 2 is a plot indicating possible statistical distribution of a product.

To explain the concept of fraction defective, reference is now made to FIG. 2 of the drawings, wherein there is plotted a graph of paper moisture distribution about an average. In particular, the abcissa in FIG. 2 represents moisture content, while the oridinate represents amounts of the sheet having a particular moisture content. The distribution of moisture in the product illustrated by FIG. 2 is not normal, as seen from the dips in the curve; it does follow general statistical laws since the ordinate values of the curve approach zero as the deviation from the mean moisture content, $\overline{M}$, approaches infinity.

It can be determined that the product should be rejected or is unaccpetable if the moisture thereof is more ttan a predetermined level, indicated on FIG. 2 by the vertical line labeled "Reject Limit." For economy purposes, however, the paper maker is willing to accept the product even though it has a moisture content above the reject limit. The ratio of paper having a moisture content more than the reject limit to the total amount of paper moisture content is referred to as fraction defective and is represented as the ratio of the area below the curve and to the right of the reject limit to the total area below the curve. Stated mathematically, the moisture fraction defective, (MFD), is expressed as:

$$MFD = \frac{\int_{t_i}^{t_i+T} f(M - M_R)\,dt}{\int_{t_i}^{t_i+T} 1\,dt}$$

where:

M is the instantaneous value of moisture detected by dry end gauge 33, $M_R$ is the moisture reject limit, indicated on FIG. 2 and preselected by the paper manufacturer.

$t$ is time,

T is the length of an integration or averaging interval, generally equal to ten minutes, $t_i$ is the instant of time at which the integration interval T beings, $f(M-M_R)=0$ for M less than $M_R$; and $f(M-M_R)=1$ for M equal to or greater than $M_R$.

Figure 4:
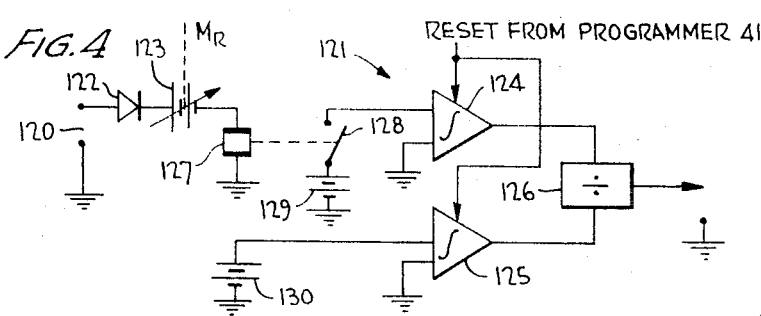
FIG. 4 is a circuit diagram of a fraction defective computer in the system of FIG. 1.

To determine fraction defective of moisture in the finished paper product at the dry end of the process, the D.C. output voltage of measuring circuit 44 is continuously applied to fraction defective computing network 61, having analog computer circuitry described infra in conjunction with FIG. 4. Fraction defective calculator 61 is also responsive to a D.C. input voltage, set by an operator, to represent the desired or set point moisture reject limit.

Fraction defective computer 61 continuously derives a very slowly varying D.C. output voltage in accordance with Equation 4 and indicative of what percentage of the time the paper measured by gauge 33 has a moisture content greater than the limit $M_R$. Computer 61 is activated in response to the output of programmer 41 so that integrators therein are reset to a zero level periodically; a convenient resetting time being while gauges 32 and 33 are in the single point operating mode once every 20 minutes.

The output signal of computer 61 is fed to analog subtraction circuit 62, having a minuend signal comprised of a D.C. voltage set by an operator to equal the percent or fraction defective the paper maker is willing to accept; typically the value set by the opesator is about 3%. Thereby, subtraction circuit 62 derives continuously a very slowly varying D.C. error signal indicative of the deviation of the actual dry end fraction defective from the set point moisture fraction defective.

In accordance with the same theory as was developed for moisture fraction defective computation, computer 63 responds continuously to the output of basis weight and moisture measuring circuits 43 and 44 to derive indications of fraction defective fiber content. One difference between computers 61 and 63 is that the former determines fraction defective in response to moisture values above a reject limit, while the latter calculates fraction defective in response to fiber content signals less than a reject limit. It is also to be noted that for certain types of paper the calculation of moisture fraction defective is responsive to variations above and below moisture rejection limits.

The fiber content signal coupled to computer 63 is derived by feeding the moisture output signal of circuit 44 to the minuend input of analog subtraction network 78, having a subtrahend input responsive to a constant D.C. voltage proportional to unity. The D.C. difference output of which is the D.C. dry end basis weight output voltage of circuit 43. Multiplier 79 generates a D.C. output voltage representing fiber weight of the finished paper product in response to the inputs thereto, which voltage is coupled to fraction defective computer 63. Computer responds to the actual fiber weight signal applied thereto by multiplier 79, and an analog D.C. set point voltage indicative of the fiber weight reject limit, (BDBW), acceptable to derive a fraction defective output signal in the same manner indicated supra regarding computer 61. The D.C. output voltage of computer 63 is compared in subtractor 64 with a set point indicating D.C. voltage that represents the desired value of dry end fiber fraction defective, $BDBW_{FD}$.

Generally, however, a paper maker does not determine the quality of the finished product in terms of fiber content, i.e., bone dry basis weight, but determines the product quality as a function of dry end moisture and basis weight. To compute the bone dry limit, therefore, the operator feeds into the system voltages from D.C. sources (not shown) representing dry end basis weight and moisture limits into a fiber content computer connected in the same manner as subtracter 78 and multiplier 79. The fraction defective of fiber content is the same as fraction defective for dry end basis weight because fraction defective is a ratio of acceptable product to total product and as such is not changed by equal variations of multiplying terms in the numerator and denominator. Thereby, the $BDBW_{FD}$, input signal to subtracter 64 can be merely relabeled $BW_{FD}$, basis weight fraction defective desired. The error is insignificant for normal moisture content.

The error signals generated by subtraction networks 62 and 64 are integrated by integrators 262 and 264 respectively, and respectively combined with the output voltage of multipliers 57 and 58 to control the flow of fiber into pump 14 and headbox 15 and the drying rate of dryer section 19 in a manner tending to reduce the error signals to zero.

The manner by which the output signals of multiplier 58 and integrator 262 are combined in controller 66 for activating dryer section 19 will now be considered. Broadly, controller 66 derives a signal representing the total amount of moisture to be withdrawn from the sheet by the dryer sections 21 and 25 and feeds the sections so that the relatively slow response time of steam dryers 21 is compensated with segmented trim dryers 25, having a relatively fast speed of response. Because of the one minute transport lag between wet end gauge 31 and high speed trim dryer 25, there is a one minute delay between the time a wet end moisture signal is derived from gauge 31 and the application of that signal to the trim dryer. In contrast, the wet end moisture signal derived from gauge 31 is applied immediately to slow response steam dryer 21. To maintain the total drying rate of dryer section 19 at a level determined by the output voltages of multiplier 58 and integrator 262 and independent of the divergent dryer response times, a feedback loop between the dryer sections is provided.

As described in detail infra in conjunction with FIG. 6, controller 66 responds to the wet end moisture indicating output of multiplier 58 to derive a signal that is immediately coupled as a D.C. set point input voltage for a servo loop controlling steam dryers 21. The servo loop is also responsive to a D.C. voltage proportional to the actual drying rate of steam dryer 21 in response to signals derived from temperature transducers 68 and 69, mounted on each of the cylinders comprising the steam dryer. For purposes of simplicity, only the transducers 68 and 69 for two of the steam drying cylinders is illustrated. The signals from all of the temperature transducers are fed to computer 71, which generates signals representing average temperature for the cylinders comprising steam dryer 21. The average temperature signal is utilized by computer 71 to derive a D.C. output voltage indicative of actual drying rate in steam dryer 21. The output of computer 71 is coupled to the servo loop in controller 66 and compared with the steam dryer set input derived in the controller to drive controller 72 for valve 23 in the steam supply line. Controller 72 is preferably of the integral type described in Spergel et al., Pat. No. 2,955,206.

High speed, fast response time trim dryer 25 is driven in response to the inputs to controller 66 in an entirely different manner from that utilized for driving steam dryer 21. In particular, controller 66 drives dryer 25 in response to a signal indicative of the desired drying rate of dryer 19, which signal is generated by combining the slowly varying moisture fraction defective error signal derived from integrator 262 with a delayed replica of the wet end moisture indicating output signal of multiplier 58. The wet end moisture signal is delayed by the one minute transport lag between gauge 31 and trim dryer 25 because of the trim dryer high speed of response. To compensate for the response time properties of steam dryer 21, trim dryer 25 is also driven in response to the output of computer 71, indicative of the actual drying rate of steam dryer 21. The signal indicative of desired total drying rate and the actual drying rate of dryer 21 are combined in a second servo loop with the D.C. output of temperature transducer 65. Transducer 65 is mounted in trim dryer 25 so that the signal it generates is proportional to the actual trim dryer drying rate. Thereby, the error signal of the second servo loop is a D.C. signal indicating the drying rate set point for trim dryer 25 to satisfy the indicated drying rate for the entire dryer section 19. The error signal of the second servo loop is derived by controller 66 on lead 70 and is fed in a like manner to each segment of trim dryer 25 via adding networks 77 and dryer actuators 73, described infra. As time progresses and the actual drying rate of steam dryer 21 changes to catch up with the variations in detected wet end moisture, the error signal driving actuators 73 decreases, accompanied by a return of the trim dryer drive signal on lead 70 to approximately the same value as prior to a detected moisture change derived from multiplier 50.

According to another feature of the disclosed system, variations of wet end moisture for different points across the width of the sheet, i.e., at different cross machine direction locations, are compensated by deriving a composite moisture profile in response to the output of dry end scumming moisture gauge 33. The composite moisture profile is representative of the average moisture at different cross machine direction points over a relatively large number of scans of moisture gauge 33; typically the number of scans is selected as ten. To compute signals indicative of composite moisture profile, the output of measuring circuit 44 is applied to computer 75, which preferably takes a form described and illustrated in the copending application of Edward J. Freech. Ser. No. 682,336, filed Nov. 13, 1967, and commonly assigned with the present invention. Composite moisture profile computer 75 is activated during the 95% of the time moisture gauge 33 is in the scanning mode, but is deactivated by programmer 41 while gauge 33 is in the single point mode. Moisture profile computer 75 is decoupled from gauge 33 while the gauge is in a single point mode because no profile data are being derived from the gauge at such times. Moisture profile computer 75 includes a plurality of outputs, equal in number to the number of segments in trim dryer 25, whereby it derives voltages indicative of the average moisture at a plurality of cross direction regions in response to several gauge scans at different machine direction locations. The output signals of composite moisture computed 75 are applied to profile leveling computer 76, having a number of outputs equal to the quantity of trim dryer sections. Computer 76 compares the separate profile signals to derive control voltages on its output leads whereby each of the trim dryer sections is adjusted so that the sheet has a consistent moisture across its entire width. Profile leveling computer 76 is described in either of United States Pats. 3,040,807 or 3,214,845, issued respectively to Chope and Huffman on June 26, 1962 and Nov. 2, 1965.

Each of the outputs of profile leveling computer 76 is added in a like manner with the trim dryer output signal of controller 66 in a bank of adding circuits 77, equal in number to the number of segments of trim dryer 25. The analog output signals from each of the adders in bank 77 is applied to a separate one of the controllers in bank 73, which controllers generate power in accordance with the required heat in each of the sections of trim dryer 25. Thus,, trim dryers 25 serve a dual function of leveling profile variations in the moisture content of the sheet and compensating for the lag of slow response stream dryers 21.

According to another aspect of the present system, the fiber content in the cross machine direction is adjusted so that it is relatively consistent. To this end, a composite fiber profile is derived from dry end gauges 32 an 33 to control the positions of screws 16 comprising the slice of headbox 15. The fiber content at the dry end of the process is calculated on an instantaneous basis in response to the outputs of dry end basis weight measuring circuit 43 and moisture measuring circuit 44 by substration network 78 and multiplier 79, as indicated supra. The output signal of multiplier 79 is fed to composite fiber profile controller 81, actuated in response to the output of programmer 41 at all times except when gauges 32 and 33 are in the single point mode. Controller 81 responds to successive scans of gauges 32 and 33 to derive a plurality of output signals, equal in number to the number of slice screws 16. The output signals of controller 81 are voltages indicating the amount by which a particular slice screw 16 must be adjusted to achieve uniformity of fiber content across the width of the sheet. The apparatus comprising controller 81 is similar to that described supra with regard to composite moisture profile computer 75 and profile leveling computer 76. The several output signals of controller 81 are applied to separate motors (not shown) for driving slice screws 16.

In addition to the cross direction fiber control performed by controller 81 on slice screws 16, the present system provides means for controlling the fiber flow into headbox 15, whereby the total fiber in the sheet, along its length or in the machine direction, is maintained within bounds. A set ponit signal for the amount of fiber flow into pump 14 and headbox 15 is derived in response to the relatively high frequency predicted bone dry or fiber content output signal of multiplier 57 and the slowly varying fiber content error fraction defective output signal of integrator 264. Because fiber flow control is in response to the fiber content signal derived from measurements made at the wet end of the process, at a transport lag position close to the fiber flow inlet, relatively continuous control of fiber flow can be attained.

The output signals of multiplier 57 and integrator 264 are combined to derive a fiber flow set point in fiber flow computer 82. Fiber flow computer 82 derives a fiber flow set point output by subtracting a predetermined D.C. voltage representing a predetermined value of fiber content based on a prior knowledge from the predicted fiber content signal generated by multiplier 57. The resulting error signal between the predicted and predetermined fiber content is multiplied by a constant and added with the integral of integrated fiber content fraction defective error output signal generated by integrator 264. Stated mathmetically, the value of output signal, F, derived by computer 82 is expressed as:

$$F = -Q(\hat{BD} - \hat{BD}_0 + \int(BDBWFDE)dt \qquad (6)$$

where:

$\hat{BD}$ = predicted instantaneous bone dry output of multiplier 57, $\hat{BD}_0$ = predetermined fiber content, Q = a constant, and (BDBWFDE) = the error of fiber content fraction defective.

The fiber flow set point output voltage of computer 82 is integrated by integrator 282 and fed to fiber flow controller 84, described in detail infra in conjunction with FIG. 4, which derives output signals to control the amount of fiber flowing into pump 14 from source 12 by adjusting valves 35 and 36. Fiber flow controller 84 responds to the output of fiber flow computer 82 so that with a predetermined setting of water flow valve 35, mixture valve 36 is adjusted until a maximum flow rate that the system can handle is attained. After the maximum flow rate that the system can handle is attained by opening valve 36 to its fullest extent, the ratio of fiber to clear water flowing into pipe 13 is changed from the preadjusted value by adjusting valve 35 to satisfy the set point output of flow computer 82.

Control of valves 35 and 36 in response to the consistency and flow indicating output voltages derived from fiber flow controller 84 is by means of conventional servo feedback loops. In particular, the consistency or percentage fiber of the material flowing in line 13 is measured with gauge 85, the output signal of which is a D.C. voltage that is compared with the consistency output signal of fiber flow controller 84 in subtraction network 86. The error signal derived from subtraction network 86 is fed to servo 87 that adjusts the setting of valve 35. The volume flow rate of material moving through the line through valve 36 is measured with flow meter 88, deriving a D.C. output signal which is compared in subtraction network 89 with the desired or set point for flow through valve 36. The error signal derived from subtraction network 89 is fed to servo actuator 91, whereby the set point flow rate output of controller 84 is maintained.

Figure 3:
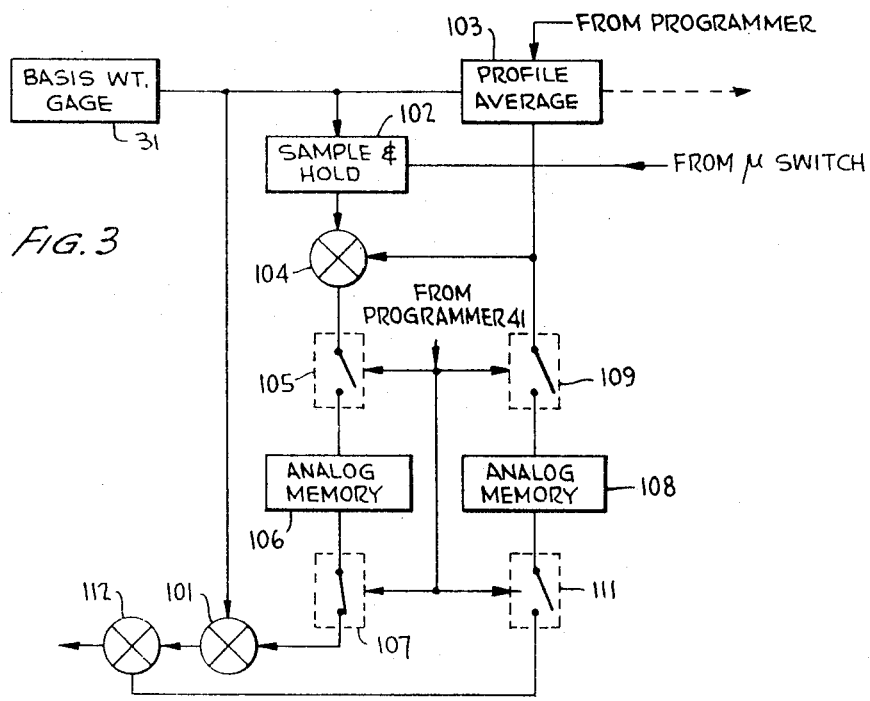
FIG. 3 is a block diagram of one of the measuring circuits employed in the system of FIG. 1.

Consideration is now given to the apparatus and operating mode of measuring circuit 42 by referring to FIG. 3.

Broadly, measuring circuit 42 computes average basis weight for the entire sheet while gauge 31 is in the single point mode by initially calculating the profile average basis weight in response to gauge 31 scanning across the sheet width. The computed average basis weight signal is compared with the basis weight at the cross machine direction point where gauge 31 is located during the single point mode, whereby an error between the selected point and average basis weight is established. The error voltage is combined with the basis weight gauge output signal while the gauge is in the single point mode to derive the indication of average basis weight on an instantaneous basis.

To these ends, the D.C. analog voltage generated by basis weight gauge 31 is coupled to three parallel channels, respectively including subtraction circuit 101, sample and hold circuit 102 and profile averaging computer 103. Profile averaging computer 103 is responsive to signals from programmer 41, whereby the averaging process is performed only while gauge 31 is being scanned across the width of the sheet. In contrast, sample and hold network 102 is responsive to the output of basis weight gauge 31 whenever the scanning gauge passes over the preselected point where the gauge is driven while it is in the single point mode. The output voltages of sample and hold network 102 and profile averaging computer 103 are respectively supplied as minuend and subtrahend input signals to analog computer subtracter 104. Hence, upon the completion of a scan of gauge 31 across the width of the sheet, the output voltage of subtracter 104 is a signal representing the difference in basis weight at the selected point from the average basis weight across the entire sheet.

The output voltage of difference network 104 is coupled through switch 105 to analog memory 106 upon the completion of a scan of gauge 31 in response to the switch being closed by the programmer at that time. Analog memory 106 stores the signal fed thereto through switch 105 until another signal is fed to the memory in response to the next closure of the contacts of switch 105. The output of analog memory 106 is continuously derived and normally fed through the contacts of normally closed switch 107 to the subtrahend input of difference network 101, the minuend input signal of which is responsive to the output of basis weight gauge 31. Switch 107 is normally maintained in the closed position in response to signals from programmer 41, except during the interval when gauge 31 is being scanned across the sheet. Thereby, at all times while basis weight gauge 31 is in a single point mode, the difference output signal of subtracter 101 is a D.C. analog voltage representing the average basis weight of the sheet as it passes wet end gauge 31.

To determine the average basis weight of the sheet while gauge 31 is scanning across the sheet, the value of the profile average during the preceding scan of the gauge is stored. The stored voltage is compared with the output of basis weight gauge 31 while the gauge is making a new scan, which occurs 20 minutes subsequent to the scan which resulted in the previously stored profile average signal. To derive the average sheet basis weight signal while gauge 31 is in the scanning mode, the output of profile average computer 103 is applied to analog memory 108 through switch 109 at the same time that the output of subtractor 104 is applied to analog memory 106. Memory 108 stores the profile average output of computer 103 until the contacts of normally open switch 109 are again closed by the output of programmer 41. The output of analog memory 108 is coupled through switch 111 to the subtrahend input of subtraction circuit 112 during the entire time while gauge 31 is scanning across the sheet in response to a control signal applied to the switch by programmer 41. During the interval while gauge 31 is scanning across the width of the sheet, programmer 41 activates switch 107 so that the output voltage of memory 106 is decoupled from the subtrahend input of difference circuit 101. Thereby, the minuend input to difference network 112 is responsive solely to the output voltage of basis weight gauge 31 and the output voltage of network 112 is a D.C. analog voltage proportional to the instantaneous basis weight of gauge 31 while it is in the scanning mode minus the profile average basis weight taken for the previous scan of gauge 31.

While basis weight gauge 31 is in the single point mode the subtrahend input to subtraction network 112 is zero because switch 111 is maintained in an open circuit condition in response to the output of programmer 41. Hence, the average basis weight difference signal derived from subtraction network 101 is coupled directly through difference network 112.

It is to be recognized that the circuit of FIG. 3 can also be employed, with slight modification, for each of measuring circuits 43 and 44. It is to be recalled that dry end gauges 32 and 33 scan across the width of the sheet continuously, except for a one minute time interval while they are in the single point mode. Gauges 32 and 33 are positioned, while in the single point mode, at the same location across the sheet width as wet end gauge 31 while it is in the single point mode. Dry end gauges 32 and 33 are in the single point mode during the first minute while wet end gauge 31 is being scanned, whereby identical cross and in machine sections of the sheet are detected by all of gauges 31–33. To enable a comparison of the data derived from gauges 32 and 33 while they are in the single point mode to be made with the corresponding data derived from the sheet while gauge 31 is in the last minute of single point operation prior to scanning, each of measuring circuits 43 and 44 subtracts from the instantaneous output of the gauge to which it is responsive the deviation of the single point measurement from the profile average derived from the previous scan of the gauges.

To these ends, FIG. 3 is modified so that networks 101–103 are responsive to the output signals of detectors 32 or 33, depending upon whether circuit 43 or 44 is being considered. For purposes of simplicity in explanation, basis weight gauge 31 of FIG. 3 is assumed to be replaced with basis weight gauge 32 in considering the manner by which measuring circuit 43 functions. It is to be understood that measuring circuit 44 responds to moisture gauge 33 in exactly the same manner as to be described for measuring circuit 43.

While the basis weight gauge at the dry end is scanning, profile averaging computer 103 is activated by programmer 41; at the same time programmer 41 open circuits each of switches 105, 107, 109 and 111. Thereby, the output signal of subtraction network 112 is a measure of the instantaneous basis weight sensed by scanning gauge 32, which signal is coupled to basis weight fraction defective computer 63, as well as to composite fiber profile controller 81, the latter connection being via multiplier 79. Upon the completion of each scan of basis weight gauge 32, the output voltage of profile average computer 103 is a measure of the average basis weight across the sheet width. The signal accumulated by computer 103 during each scan is normally read from the average computer upon the completion of each scan in response to a signal from programmer 41, which simultaneously discharges capacitors in the averaging network to zero. The output of averaging computer 103, however, is normally decoupled from any of the other circuits in the network since all of switches 105, 107, 109 and 111 are open circuited by a control signal from programmer 41.

Upon completion of the scan immediately preceding operation of gauge 32 in the single point mode, programmer 41 derives a control signal to close switches 105 and 107. A mircoswitch is provided to enable sample and hold network 102 in response to each passage of gauge 32 over the single point location. Upon the completion of each scan of gauge 32 there is thereby derived from subtractor 104 a voltage proportional to the difference in the average and single point basis weights. The subtracter 104 D.C. analog output voltage is coupled to memory 106 only in response to switch 105 being closed by programmer 41 once every 20 minutes, immediately prior to gauge 32 being driven to the single point mode. With the closure of switch contacts 105 analog memory 106 is thereby reloaded once every 20 minutes with a signal indicative of the departure in dry end basis weight at the single point location from the average basis weight across the sheet.

The output of memory 106 is coupled to the subtrahend input of subtraction circuit 101 during the entire one minute interval while gauge 32 is in the single point mode in response to the contacts of switch 107 being closed during said time by programmer 41. Thereby, the output voltage of subtracter 101 is indicative of profile average basis weight of the sheet for each instant during a one minute interval while gauge 32 is in the single point mode. The output of subtracter 101 is fed through subtracter 112 in unmodified form since the subtracter subtrahend input signal is zero and coupled through switch 51 as indicated supra to enable the adaptive constant $k$ to be repeatedly once every 20 minutes.

Reference is now made to FIG. 4 of the drawings wherein is illustrated a schematic diagram of an analog computer version of the fraction defective computer. The fraction defective computer of FIG. 4 may be utilized, with slight modification, either as computer 61 or 63 to determine the fraction defective of dry end moisture or fiber content, respectively. It is to be recalled from the discussion of FIG. 2 and Equation 4 that fraction defective is the ratio of the amount of time the monitored variable is less than or greater than a limit amount of the variable compared to the total time paper is being manufactured, a ratio of two areas or integrals.

From Equation 4, the integral comprising the numerator of the ratio is the total time the amount of material is greater or less than a limit; determined with the circuit of FIG. 4 by upper channel 121. Channel 121 includes diode 122 connected in series between input terminals 120, D.C. voltage source 123 and relay winding 127 which is energized whenever the normally back-biased path through the diode and D.C. source is rendered into a low impedance state. Energization of relay 127 results in normally open-circuited contact 128 being closed to couple a reference voltage from source 129 to the input of D.C. analog integrator 124, which is reset by programmer 41 once every 20 minutes. The potential, $M_R$, of D.C. source 123 is variably controlled by the paper maker to correspond with the acceptable limit or boundary of moisture or basis weight, as indicated by the reject limit line of FIG. 2.

D.C. source 123, in combination with diode 123, establishes the reject limit because the combination respectively represents open and short circuit conditions for voltages at terminals 120 greater and less than $M_R$. In response to the circuit comprising diode 122 and source 123 being respectively activated to the short and open circuit conditions, the reference voltage of source 129 is fed directly to integrator 124 or the integrator 124 input is zero. Integrator responds to the zero or predetermined finite voltage fed thereto to derive an output having an amplitude indicative of the dividend of Equation 4, supra.

The output voltage of integrator 124 is compared with a signal indicative of the total time upper channel 121 has been activated since the last reset of integrator 124, i.e., the activation time of the process or defective computer. The activation time signal is derived by feeding a constant D.C. voltage from source 130 to the input terminals of integrator 125, which is reset simultaneously with integrator 124. Thereby, the output of integrator 125 is a sawtooth voltage increasing in amplitude linearly as a function of time relative to the last reset of integrators 124 and 125. Comparison of the outputs of integrators 124 and 125 is performed in analog division network 126. Division network 126 includes dividend and divisor inputs respectively responsive to the D.C. output voltages of integrators 124 and 125. Thereby, the output voltage of division network 126 is a D.C. signal having an amplitude equal to the ratio of the amount of defective product, i.e., the amount of product having a value outside the limit $M_R$, to the total amount of the product. As indicated supra, the ratio output of division network 126 is, therefore, indicative of the percentage of the sheet having defective moisture or basis weight, referred to herein as fraction defective.

Reference is now made to FIG. 5 of the drawings wherein there is illustrated a schematic diagram of the apparatus comprising fiber flow controller 84. Broadly, it is the function of controller 84 to adjust valves 35 and 36 so that a fiber flow set point derived from integrator 282 is attained for the slurry fed to pump 14 and headbox 15.

Controller 84 responds to a fiber flow rate set point signal derived by feeding the output of integrator 282 and to consistency and flow rate transducers 85 and 88 in line 13 respectively upstream and downstream of valve 36 to derive a signal indicative of the amount of fiber flow change that should be made. The fiber flow change signal is combined with the actual flow signal derived from transducer 88 to establish a signal indicative of corrected fiber flow into pump 14. If the corrected fiber flow exceeds a limit established by the properties of valve 36 on the total mass fiber mixture, consistency valve 35 for the clear water source 11 is activated. Otherwise, valve 35 is maintained at a preselected point and the consistency of the mixture flowing in pipe 13 is not changed.

To these ends, the circuit of FIG. 5 includes multiplier 141 responsive to the consistency and flow rate output signals of transducers 85 and 88, respectively. The output signal of multiplier 141 is, therefore, a D.C. amplitude proportional to the actual fiber flow into pump 14 from pipe 13. The fiber flow output signal of multiplier 141 is compared in subtraction circuit 142 with the set point fiber flow derived from integrator 282. The output of difference circuit 142, indicative of the fiber flow error, is applied as a numerator input to division circuit 143, the dividend input of which is the D.C. output of consistency transducer 85.

In response to the inputs applied thereto, division circuit 143 derives a signal proportional in amplitude to the error or change to be effected between the actual flow and the desired flow, as reflected by the flow rate output of subtraction circuit 142. The change in the flow rate of the mixture in pipe 13 is combined with the actual flow rate derived from transducer 88 in analog computer summing network 144, the resultant output of which is applied to limit detector 145.

Limit detector 145 derives a binary one signal only in response to the output of adding circuit 144 exceeding or being equal to a predetermined limit, commensurate with the limit of flow which can be passed through valve 36. Whenever the output of adding circuit 144 indicates that the flow would be less than the limit that valve 36 is capable of passing, the output of limit detector 145 is a binary zero.

The binary output signal of limit detector 145 is applied as a control voltage to switch 146, whereby the switch armature 145 respectively engages contacts 148 and 149 in response to the binary zero and one outputs of limit detector 145. Switch 146 selectively gates the output voltage of adding circuit 144 to the servo loops for valves 35 and 36. With armature 147 engaging contact 148, the output voltage of adding circuit 144 is applied directly to one of the inputs of subtraction network 89 in the feedback loop controlling valve 36. In contrast, engagement of armature 147 and contact 149 results in the output voltage of adding circuit 144 being applied to an input of subtraction network 86 in the servo loop for control of valve 35.

The signal applied to the servo loop controlling valve 36 can be applied directly without modification, since the signal indicates flow rate set point. In contrast, the signal for controlling valve 35 must be altered to reflect a predetermined consistency control. To this end, terminal 149 is connected to the numerator input of division circuit 151, the divisor input of which is responsive to the flow indicating output of transducer 88. In response to a finite fiber flow change numerator signal being applied thereto through switch 147, division circuit 151 derives an output voltage indicative of one plus the ratio of the flow rate change calculated by division circuit 143 to the actual flow rate in pipe 13, as derived from transducer 88. The consistence output signal of division circuit 151 is combined in added 152 with a predetermined D.C. voltage from source 153 and indicative of the predetermined consistency for the ratio of fiber to clear water from sources 12 and 11, respectively. The output of adder 152 is applied to an input of subtraction network 86 in the feedback loop controlling valve 35. Thereby, if the limit established by detector 145 is not exceeded by the output of adder 144, the preset input to summing network 152 is constantly applied to the servo loop for valve 36. In the event the limit of detector 145 is exceeded, however, valve 36 is driven to its widest opening and valve 35 is controlled in response to the error indicating consistency signal derived from division circuit 151, as well as from the preset signal applied to added 152.

Because the fiber set point input signal to controller 84 is derived primarily from wet end gauge 31, the dry end fraction defective signal being of very low frequency and not subject to short term variations, the fiber controller output signals can be applied continuously or approximately once every 15 seconds to the actuators of valves 35 and 36. In contrast, prior art techniques relying upon gauge readings at the dry end of the process limit the application of control signals to the valve actuators to a periodicity of the total process transport lag, 1.5 minutes generally. Continuous or 15 second control can be effected with the present invention because it is not necessary to wait a protracted time interval prior to determining what effect the control action had on the product.

Reference is now made to FIG. 6 of the drawings wherein there is disclosed in block diagram form the apparatus comprising moisture computer 66. It is to be recalled that the function of moisture computer 66 is to determine the drying rate of steam dryer 21 and trim dryer 25. In general, the moisture computer responds to the wet end moisture indicating output signal of multiplier 58 and immediately applies a control signal to slow response time steam dryer 21. Simultaneously, the wet end moisture indicating output signal is delayed for a time commensurate with the transport lag between wet end gauge 31 and trim dryer 25 and is combined with the moisture fraction defective error output of integrator 262 to derive a signal indicative of the total drying rate requirement of both the steam and trim dryers in section 19. The total drying rate requirement signal is compared with error signals from the steam and trim dryers to control the trim dryer drying rate.

Referring to FIG. 6 in particular, the wet end moisture output of multiplier 58 is fed through delay element 161, having a delay time of approximately one minute, the transport lag between wet end gauge 31 and trim dryer 25, to computer 162 which derives an output signal indicative of the total drying rate requirement of dryer section 19. Computer 162 scales the delayed wet end moisture signal by a constant $R_1$ and linearly combines the resultant with the output of integrator 262. Thereby, the D.C. output voltage ($V_{inst}$) of computer 162 indicative of the set point for the drying rate of dryer 19 is represented as:

$$V_{inst} = R_1(M_w)_D + SEFDMdt$$

where:
$R_1$=constant,
$(M_w)_D$=wet end moisture delayed for the transport lag between gauge 31 and trim dryer 25, and
EFDM=fraction defective error in moisture.

The total drying rate requirement indicating output signal of computer 162 is compared in analog summing circuit 163 with the actual drying rate of steam dryer 21. Analog summing circuit 163 responds to the stated inputs thereof to derive a trim dryer set point voltage in accordance with:

$$V_t = V_{sa} - V_{inst}$$

where:
$V_t$=the set point for trim dryer 25,
$V_{sa}$=the actual drying rate of steam dryer 21, and
$V_{inst}$=the total drying rate requirement of both the steam and trim dryers, as derived by the output of computer 162.

Prior to considering the manner by which the signal $V_{sa}$ is derived, consideration will be given to the control apparatus for steam dryers 21. Steam dryers 21 are responsive to the wet end moisture indications, $M_w$, derived from multiplier 58 immediately upon the derivation thereof. The wet end moisture indicating output of multiplier 58 is scaled by a predetermined constant, $R_2$, in analog multiplication network 164, the output of which is a D.C. signal indicative of the required drying rate $V_{mw}$ of dryer section 19. $V_{mw}$ is also used to represent the set point drying rate for steam rollers 21. Because of the inherent lag of steam dryers 21, the set point output voltage of multiplier 164 is applied directly to the input of a servo system including analog difference network 67, the output of which drives integral controller 72 for valve 23 in the steam line.

Difference network 67 is also responsive to a D.C. signal indicative of the actual drying rate of steam dryers 21. A signal representing actual drying rate of dryers 21 is derived from measurements of the actual average temperature in steam dryers 21, generated by temperature transducers 68 and 69, having outputs which are fed to computer 71. Computer 71 comprises a non-linear function generator of a known type which is empirically calibrated to relate the surface temperatures of the dryer to the drying rates determined from experimental data. It responds to the average of D.C. voltages generated by the transducers as at 68 and 69 to derive a voltage that is fed to difference 67 and is proportional to the actual drying rate of steam dryers 21.

The set point for driving all of the sections comprising trim dryer 25 is adjusted to enable the trim dryer to remove any moisture from the sheet that should have been, but was not, removed by steam dryer 21. The set point signal is thereby derived by subtracting in analog difference circuit 163 the total drying rate requirement D.C. output signal of computer 162 from the output signal of computer 71, indicative of the actual drying rate for steam dryers 21. The D.C. output of difference network 163 is compared in analog subtraction circuit 165 with the actual trim dryer drying rate signal generated by temperature transducer 65 mounted in the fast response time dryer. Difference circuit 165 derives an error signal for controlling all of sections of the trim dryer 25 alike, which error signal is coupled to dryer controllers 73 via adders 77, as indicated supra.

To provide a better understanding of the drying system operation, let it be initially assumed that the same wet end moisture and moisture fraction defective error signals have been derived from multiplier 52 and subtracter 63 for a relatively long time period. Under such circumstances, the conditions of steam dryer 21 and trim dryer 25 are stabilized and zero error signals are applied to controllers 72 and 77. Now let it be assumed that a moist spot in the sheet is detected by wet end basis weight gauge 31 as reflected in the output signal of multiplier 58. At the same time, it is assumed that the slowly varying moisture fraction defective error remains constant.

Under the assumed conditions, the wet end moisture output signal of multiplier 58 is scaled in multiplier 164 and applied to error sensing subtraction circuit 67. Subtraction circuit 67 thereby derives an error signal indicative of the amount by which the steam applied by source 22 to dryers 21 should be increased. The error signal generated by circuit 67 is applied to controller 72 that drives valve 23 to be open to a greater extent and additional steam is coupled from source 22 to dryers 21. The dryers, however, do not respond instantly to steam from source 22, but have an exponential rise in drying capabilities with a time constant on the order of two minutes. While the drying rate of steam dryers 21 slowly increases, the output of computer 71 also increases and the error output of difference circuit 67 is decreased slightly.

During the first minute after the wet spot had been detected by gauge 31, the increase in the drying rate occasioned by steam dryers 21 is compensated with a decrease in the drying rate of trim dryer 25 through control of trim dryer 25 servo loop by cicuit 163. The trim dryer drying rate is decreased because of the transport lag between wet end gauge 31 and trim dryer 25 and occurs because the output voltage of computer 163 is decreased in response to the increasing value of the value of $V_{sa}$ while the value of $V_{inst}$, the output of computer 162, remains constant.

Upon completion of the one minute transport lag between wet end gauge 31 and trim dryers 25, the wet end moisture change is reflected in the output of delay element 161 and is fed to computer 162. The computer responds immediately to the change in wet end moisture set point input fed thereto to derive a signal indicating that the total drying rate requirement of section 19 has increased, reflecting the presence of the entire moisture region of the sheet now being in the dryer. When the output of computer 162 suddenly increases, the actual drying rate of steam dryers 21 has increased to approximately 40% of the change derived one minute earlier from the output of multiplier 58. The output voltage of computer 163 responds to the difference in the $V_{sa}$ and $V_{inst}$ outputs of computers 71 and 162 to derive an indication that the other 60% of the desired drying rate of dryer 19 must be made up by trim dryer 25. The change in the set point of trim dryer 25 at this time is, however, equal to the change in the output of computer 163 since the trim dryer output was previously reduced to compensate for the slow rise in the actual drying rate of steam dryers 21. As time progresses, the moisture actually removed by steam dryers 21 increases to a point whereby the error indicating output signal of difference network 67 is again zero. Under such circumstances, it is no longer necessary to compensate for the lag of the steam dryers and the output of the computer 163 is returned to the same value as was derived therefrom prior to the change in the sheet condition discussed.

While there has been described and illustrated one specific embodiment of the invention, it will be clear that variations in the details of the embodiment specifically illustrated and described may be made without departing from the true spirit and scope of the invention as defined in the appended claims. For example, the analog computer apparatus disclosed herein can be replaced with a digital computer system having either a hard wire or software program to control the sheet manufacture. In addition, activation of the various controllers may be effected manually in response to visual indications of the various control signals derived, instead of automatically.

I claim:

1. A system for deriving a control signal for the formation of a sheet product from indications of a sheet property derived from gauges at differing points along the length of the sheet during manufacture, one of said indications being derived from gauge means positioned to detect property indications at a relatively early point in the sheet manufacture, another of said indications being derived from gauge means positioned to detect property indications at a second point in the sheet manufacture, said sheet being treated between the early and second points, comprising means responsive to said one and another indications for comparing a sheet property for substantially the same longitudinal sheet segments at said early and second points, means responsive to said comparing means for deriving an indication of the change in the sheet property between said points resulting from the sheet treatment, means activating said comparing means repeatedly while the sheet is being formed, means responsive to said deriving means for storing the change indication between activations of the comparing means, and means for combining the stored indication with a signal derived after the change indication has been stored from the gauge means at said early point to derive the control signal.

2. A system for deriving a control signal for the formation of a sheet product comprising first gauge means for sensing property variations of the sheet positioned at a relatively early point in the sheet manufacture, second gauge means positioned to detect property variations of the sheet at a second point in the sheet manufacture, said sheet being treated between the early and second points, means responsive to the property variations detected by both said gauge means for comparing a sheet property for substantially the same longitudinal sheet segments at said early and second points, means responsive to said comparing means for deriving an indication of the change in the sheet property between said points resulting from the sheet treatment, means for activating said comparing means repeatedly while the sheet is being formed, means responsive to said deriving means for storing the change indication between activations of the comparing means, and means for combining the stored indication with a signal derived after the change indication has been stored from the gauge means at said early point to derive the control signal.

3. The system of claim 2 wherein the sheet product is paper and the treatment is drying, said first gauge means includes means for deriving a first signal indicative of wet end basis weight, said second gauge means includes means for deriving a second signal indicative of fiber content of the finished sheet, said comparing means includes means responsive to said first and second signals for deriving an indication of drying rate by the drying treatment, and said combining means includes means for multiplying said first signal and said drying rate indication.

4. The system of claim 3 wherein said first gauge means includes means for deriving a third signal indicative of wet end moisture and means for combining said third signal with the stored indication to derive a signal indicative of dryer set point.

5. The system of claim 4 wherein the paper sheet is dried with fast and slow response time dryers respectively positioned at the dry and wet ends, means for coupling the dryer set point signal to said fast and slow response time dryers so that the total heat applied by the dryers to any segment of the sheet is commensurate with a moisture value of the set point signal.

6. In combination with a system for forming a sheet product, first gauge means for sensing property variations of the sheet positioned at a relatively early point in the sheet manufacture, second gauge means positioned to detect property variations of the sheet at a second point in the sheet manufacture, said sheet being treated between the early and second points, means responsive to the property variations detected by both said gauge means for comparing a sheet property for substantially the same longitudinal sheet segments at said early and second points, means responsive to said comparing means for deriving an indication of the change in the sheet property between said points resulting from the sheet treatment, means for activating said comparing means repeatedly while the sheet is being formed, means responsive to said deriving means for storing the change indication between activations of the comparing means, means for combining the stored indication with a signal derived after the change indication has been stored from the gauge means at said early point to derive a set point signal, and means responsive to said set point signal for controlling the formation of the sheet.

7. The system of claim 6 wherein the sheet product is paper and the treatment is drying, said first gauge means includes means for deriving a first signal indicative of wet end basis weight, said second gauge means includes means for deriving a second signal indicative of fiber content of the finished sheet, said comparing means includes means responsive to said first and second signals for deriving an indication of drying rate by the drying treatment, said combining means includes means for multiplying said first signal and said drying rate indication, and said control means includes means for controlling fiber flow.

8. The system of claim 7 further including dryer means for the sheet positioned between said first and second gauges, and wherein said first gauge means includes means for deriving a third signal indicative of wet end moisture, means for combining said third signal with the stored indication to derive a signal indicative of dryer set point, and means for controlling said dryer means in response to said dryer set point signal.

9. The system of claim 8 wherein said dryer means includes fast and slow response time dryers respectively positioned at the dry and wet ends, means for coupling the dryer set point signal to said fast and slow response time dryers so that the total heat applied by the dryers to any segment of the sheet is commensurate with a moisture value of the set point signal.

10. A method of deriving a control signal for the formation of a sheet product from indications of a sheet property derived from gauges at differing points along the length of the sheet during manufacture, one of said indications being derived from gauge means positioned to detect property indications at a relatively early point in the sheet manufacture, another of said indications being derived from gauge means positioned to detect property indications at a second point in the sheet manufacture, said sheet being treated between the early and second points, comprising the steps of comparing a sheet property for substantially the same longitudinal sheet segments at said early and second points to derive a measure of the sheet property change between said points resulting from the sheet treatment, said comparision being taken repeatedly while the sheet is being formed, storing the measure of the change between occurrences of the comparison steps, and combining the stored measure with the indication derived after the measure of change has been stored from the gauge at the early point to derive the control signal.

11. A method of forming a sheet product comprising sensing property variations of the sheet from measurements at a relatively early point in the sheet manufacture, sensing property variations of the sheet from measurements at a second point in the sheet manufacture, treating said sheet between said early and second points, comparing the sheet property variations sensed at said early and second points for substantially the same longitudinal sheet segments to derive a measure of the change in the sheet property between said points resulting from the sheet treatment, said comparing step occurring repeatedly while the process is being performed, storing the measure of the change between occurrences of the comparison steps, combining the stored measure with the variation sensed at the early point after the measure of change has been stored to derive a set point indication, and controlling a property of the sheet in response to the set point indication.

12. Apparatus for controlling in response to a first control signal the drying rate of a dryer section including slow and fast response time dryers comprising means responsive to the first control signal for controlling the slow response time dryer, means for deriving a data signal indicative of the actual drying rate of said slow response time dryer, and means combining said data and first control signals for deriving a further control signal and means responsive to the further control signal for controlling the fast response time dryer so that the drying rate of both said dryers equals a function of the first control signal value.

13. The apparatus of claim 12 wherein said dryers are positioned to dry a sheet, said control signal being derived in response to a moisture indicating signal derived from a gauge responsive to the sheet moisture at a position upstream of said dryers, said fast response time dryer being positioned downstream of said slow response time dryer, and further including means for delaying the application of the control signal to said fast response time dryers by approximately the transport lag between said gauge and fast response time dryer.

14. The apparatus of claim 13 including means for deriving a signal indicative of a statistical function of moisture of the sheet emerging from the dryer section, and wherein said means for deriving includes means combining said statistical function indicating signal with the control signal for deriving a further signal commensurate with the function of the control signal value.

15. The apparatus of claim 14 wherein said statistical function is commensurate with moisture fraction defective.

16. In combination with fast and slow response time dryers forming a drying system for desorbing a sheet during the manufacture thereof, said fast response time dryer being positioned downstream of the slow response time dryer, gauge means upstream of the drying system for deriving a set point signal, means for deriving a data signal indicative of the actual drying rate of said slow response time dryer, means for controlling the slow response time dryer in response to said data and set point signals, means delaying the set point signal for deriving another signal indicative of total required drying rate, said set point signal being delayed for an interval equal to the transport lag between the gauge means and the fast response time dryer, and means for controlling the fast response time dryer in response to said data and another signal so that the total drying rate of both the fast and slow response time dryers equals the total required drying rate.

17. A method of drying a sheet in response to an indication of the sheet moisture with a dryer including fast and slow response time dryers, said fast response time dryer being positioned by one transport lag downstream of the slow response time dryer and the point where the moisture indication is derived, comprising the steps of controlling the drying rate of the slow response time dryer in response to said sheet moisture indication, measuring the actual drying rate of the slow response time dryer, comparing the actual slow response time dryer drying rate with a function of the sheet moisture indication derived one transport lag previously, and controlling the fast response time dryer so that the compared quantities are equalized.

18. A system for deriving an indication of the moisture and/or bone dry basis weight of a fibrous sheet being fabricated by a fibrous sheet producing machine having a dryer, said indication being derived for the sheet prior to the sheet entering the dryer, comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet bone dry basis weight downstream of the dryer, means responsive to said second signal and to said first signal derived by said gauge means during a first time period for deriving a third signal indicative of the fraction of the total basis weight of the sheet made up of fiber upstream of the dryer, and means combining said third signal and said first signal as derived by said first gauge means at a second, later time period for deriving another signal having a functional relationship indicative of the product of said fraction and total basis weight.

19. The system of claim 18 wherein said combining means includes means for deriving the another signal as the product of said fraction and total basis weight, whereby the another signal is indicative of the sheet bone dry basis weight upstream of the dryer.

20. The system of claim 18 wherein said combining means includes means for deriving the another signal as said total basis weight multiplied by the difference between said fraction and a constant, whereby the another signal is indicative of the sheet moisture upstream of the dryer.

21. A method of deriving an indication with a computer of the moisture and/or bone dry basis weight of a fibrous sheet being fabricated by a fibrous sheet producing machine having a dryer, said indication being derived for the sheet prior to the sheet entering the dryer, said computer being responsive to first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet bone dry basis weight downstream of the dryer, said computer performing the steps of: deriving a third signal indicative of the fraction of the total basis weight of the sheet made up of fiber upstream of the dryer in response to said second signal and to said first signal as derived during a first time period, and combining said third signal and said first signal as derived during a second, later time period to derive a signal having a functional relationship indicative of the product of said fraction and total basis weight.

22. The method of claim 21 wherein said combining step comprises deriving the another signal as the product of said fractiton and total basis weight, whereby the another signal is indicative of the sheet bone dry basis weight upstream of the dryer.

23. The method of claim 21 wherein said combining step comprises deriving the another signal as said total basis weight multiplied by the difference between said fraction and a constant, whereby the another signal is indicative of the moisture upstream of the dryer.

24. A system for controlling actuator means for the flow of fiber into a fibrous sheet producing machine or a dryer of the fibrous sheet producing machine comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet bone dry basis weight downstream of the dryer, means responsive to said second signal and to said first signal derived by said first gauge means during a first time period for deriving a third signal indicative of the fraction of the total basis weight of the sheet made up of fiber upstream of the dryer, means combining said third signal and said first signal as derived by said first gauge means at a second, later time period for deriving another signal having a functional relationship indicative of the product of said fraction and total basis weight, and means for feeding said another signal to said actuator means.

25. The system of claim 24 wherein said actuator means controls the flow of fiber to the machine and said combining means includes means for deriving the another signal as the product of said fraction and total basis weight, whereby the another signal is indicative of the sheet bone dry basis weight upstream of the dryer.

26. The system of claim 24 wherein said actuator means controls the dryer and said combining means includes means for deriving the another signal as the total basis weight multiplied by the difference between said fraction and a constant, whereby the another signal is indicative of the sheet moisture upstream of the dryer.

27. A system for controlling first and second actuator means for the flow of fiber into a fibrous sheet producing machine and a dryer of said machine, respectively, comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet bone dry basis weight downstream of the dryer, means responsive to said second signal and to said first signal as derived by said first gauge means during a first time period for derving a third signal indicative of the fraction of the total basis weight of the sheet made up of fiber upstream of the dryer, means combining said third signal and said first signal as derived by said first gauge means at a second, later time period for deriving fourth and fifth signals each having a functional relationship commensurate with the product of said fraction and total basis weight, said fourth and fifth signals being respectively indicative of sheet bone dry basis weight and moisture upstream of the dryer, means for feeding said fourth signal to the first actuator means, and means for feeding the fifth signal to the second actuator means.

28. A method of controlling actuator means for the flow of fiber into a fibrous sheet producing means of a dryer of the fibrous sheet producing means in response to output signals derived from: first gauge means positioned upstream of the dryer for monitoring the sheet total basis weight and deriving a first signal indicative of the sheet total basis weight upstream of the dryer and second gauge means positioned downstream of the dryer for monitoring the sheet and deriving a second signal indicative of the sheet bone dry basis weight downstream of the dryer; said method including performing in a computer the steps of: responding to said second and to said first signal as derived by said first gauge means during a first time period to derive a third signal indicative of the fraction of the total basis weight of the sheet made up of fiber upstream of the dryer, combining said third and said first signal as derived by said first gauge means, at a second, later time period to derive another signal having a functional relationship indicative of the product of said fraction and total basis weight; and controlling the actuator in response to the another signal.

29. The method of claim 28 wherein said combining step comprises deriving the another signal as the product of said fraction and total basis weight, whereby the another signal is indicative of the sheet bone dry basis weight upstream of the dryer.

30. The method of claim 28 wherein said combining step comprises deriving the another signal as said total basis weight multiplied by the difference between said fraction and a constant, whereby the another signal is indicative of the sheet moisture upstream of the dryer.

31. A method of controlling first and second actuator means for the flow of fiber into a fibrous sheet producing machine and a dryer of said machine in response to output signals derived from: first gauge means positioned upstream of the dryer for monitoring and deriving a first signal indicative of the sheet total basis weight upstream of the dryer and second gauge means positioned downstream of the dryer for monitoring the sheet and deriving a second signal indicative of the sheet bone dry basis weight downstream of the dryer; said method including performing in a computer the steps of: responding to said second signal and to said first signal as derived by said first gauge means during a first time period to derive a third signal indicative of the fraction of the total basis weight of the sheet made up of fiber upstream of the dryer, combining said third and said first signal as derived from said first gauge means during a second time period to derive fourth and fifth signals each having a functional relationship commensurate with the product of said fraction and total basis weight, said fourth and fifth signals being respectively indicative of sheet bone dry basis weight and moisture upstream of the dryer; controlling the first actuator means in response to said fourth signal, and controlling the second actuator means in response to the fifth signal.

32. A system for deriving an indication of the moisture and/or bone dry basis weight of a fibrous sheet being fabricated by a fibrous sheet producing machine having a dryer, said indication being derived for the sheet prior to the sheet entering the dryer, comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet total basis weight downstream of the dryer, means for deriving a third signal indicative of the sheet moisture downstream of the dryer, means responsive to said second and third signals and to said first signal as derived from said first gauge means during a first time period for deriving a fourth signal indicative of the fraction of the total basis weight of the sheet made up of fiber upstream of the dryer, and means combining said fourth signal and said first signal as derived from said first gauge means during a second, later time period for deriving another signal having a functional relationship indicative of the product of said fraction and total basis weight.

33. A system for deriving an indication of the moisture and/or bone dry basis weight of a fibrous sheet being fabricated by a fibrous sheet producing machine having a dryer, said indication being derived for the sheet prior to the sheet entering the dryer, comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving second and third signals respectively indicative of the sheet total basis weight and moisture downstream of the dryer, means responsive to said second and third signals and to said first signal as derived from said first gauge means during a first time period for deriving a fourth signal indicative of the fraction of the total basis weight of the sheet made up of fiber upstream of the dryer, and means combining said fourth signal and said first signal as derived from said first gauge means during a second, later time period for deriving another signal having a functional relationship indicative of the product of said fraction and total basis weight.

34. A method of deriving an indication with a computer of the moisture and/or bone dry basis weight of a fibrous sheet being fabricated by a fibrous sheet producing machine having a dryer, said indication being derived for the sheet prior to the sheet entering the dryer, said computer being responsive to first gauge means positioned upstream of the dryer for monitoring the sheet total basis weight and deriving a first signal indicative of the sheet total basis weight upstream of the dryer, second gauge means positioned downstream of the dryer for monitoring the sheet and deriving a second signal indicative of the sheet total basis weight downstream of the dryer, means for deriving a third signal indicative of the sheet moisture downstream of the dryer, said computer performing the steps of: deriving a fourth signal indicative of the fraction of the total basis weight of the sheet made up of fiber upstream of the dryer in response to said second and third signals, and combining said fourth signal and said first signal as derived from said first gauge means during a second, later time period to derive a signal having a functional relationship indicative of the product of said fraction and total basis weight.

35. A system for controlling actuator means for the flow of fiber into a fibrous sheet producing machine comprising first gauge means positioned upstream of the dryer for monitoring the sheet total basis weight and deriving a first signal indicative of the sheet total basis weight upstream of the dryer, second gauge means positioned downstream of the dryer for monitoring the sheet and deriving second and third signals respectively indicative of the sheet total basis weight and moisture downstream of the dryer, means combining said second and third signals with values of said first signal derived from said first gauge means during two separate, spaced time periods for deriving another signal indicative of a target value for the rate of fiber flow to the machine, and means for feeding said another signal to said actuator means.

36. A method of controlling actuator means for the flow of fiber into a fibrous sheet producing means in response to output signals derived from: gauge means positioned upstream of the dryer for monitoring the sheet total basis weight and deriving a first signal indicative of the sheet total basis weight upstream of the dryer, gauge means positioned downstream of the dryer for monitoring the sheet and deriving a second signal indicative of the sheet total basis weight downstream of the dryer, and a third signal source indicative of the sheet moisture downstream of the dryer; said method including the steps of in a computer: combining said first, second and third signals to derive another signal indicative of a target value for the rate of fiber flow to the machine; and controlling the actuator in response to the another signal.

37. In combination with fast and slow response dryers comprising a drying system for desorbing a sheet during the manufacture thereof, gauge means upstream of the drying system for deriving a set point signal, means for deriving a data signal indicative of the actual drying rate of said slow response time dryer, means for controlling the slow response time dryer in response to said data and set point signals, means delaying the set point signal for deriving another signal indicative of total required drying rate, and means for controlling the fast response time dryer in response to said data and another signal so that the total drying rate of both the fast and slow response time dryers equals the total required drying rate.

38. A method of drying a sheet in response to an indication of the sheet moisture with a dryer including fast and slow response time dryers, comprising the steps of controlling the drying rate of the slow response time dryer in response to said sheet moisture indication, measuring the actual drying rate of the slow response time dryer, comparing the actual slow response time dryer drying rate with a function of the sheet moisture indication derived previously, and controlling the fast response time dryer so that the compared quantities are equalized.

39. In combination with fast and slow response dryers comprising a drying system for desorbing a sheet during the manufacture thereof, gauge means upstream of the drying system for deriving a set point signal, means for deriving a data signal indicative of the actual drying rate of said slow response time dryer, means for controlling the slow response time dryer in response to said data and set point signals, means delaying the set point signal for deriving another signal indicative of total required drying rate, said set point signal being delayed for an interval equal to the transport lag between the gauge means and the fast response time dryer, and means for controlling the fast response time dryer in response to said data and another signal so that the total drying rate of both the fast and slow response time dryers equals the total required drying rate.

40. A method of drying a sheet in response to an indication of the sheet moisture with a dryer including fast and slow response time dryers, said fast response time dryer being positioned by one transport lag downstream of the point where the moisture indication is derived, comprising the steps of controlling the drying rate of the slow response time dryer in response to said sheet moisture indication, measuring the actual drying rate of the slow response time dryer, comparing the actual slow response time dryer drying rate with a function of the sheet moisture indication derived one transport leg previously, and controlling the fast response time dryer so that the compared quantities are equalized.

References Cited

UNITED STATES PATENTS

| | | | |
|---|---|---|---|
| 3,378,676 | 4/1968 | Clement | 235—151.3 |
| 3,490,689 | 1/1970 | Hart et al. | 162—252 X |
| 3,496,344 | 2/1970 | Chope | 235—151.13 |

S. LEON BASHORE, Primary Examiner

A. A. D'ANDREA, JR., Assistant Examiner

U.S. Cl. X.R.

34—89; 162—253, 258, 263; 235—151.3, 151.35